(12) United States Patent
London et al.

(10) Patent No.: US 8,161,160 B2
(45) Date of Patent: Apr. 17, 2012

(54) XML-BASED WEB FEED FOR WEB ACCESS OF REMOTE RESOURCES

(75) Inventors: Kevin Scott London, Monroe, WA (US); Ido Ben-Shachar, Kirkland, WA (US); Ray Reskusich, Seattle, WA (US); Ersev Samim Erdogan, Seattle, WA (US); Travis Howe, Elsie, MI (US)

(73) Assignee: Microsoft Corporation, Redmond, WA (US)

( * ) Notice: Subject to any disclaimer, the term of this patent is extended or adjusted under 35 U.S.C. 154(b) by 250 days.

(21) Appl. No.: 12/039,725

(22) Filed: Feb. 28, 2008

(65) Prior Publication Data

US 2009/0222531 A1    Sep. 3, 2009

(51) Int. Cl.
   *G06F 15/173* (2006.01)
(52) U.S. Cl. ...................................................... 709/226
(58) Field of Classification Search .................. 709/226
   See application file for complete search history.

(56) References Cited

U.S. PATENT DOCUMENTS

| | | | |
|---|---|---|---|
| 5,790,853 A | 8/1998 | Nomura et al. |
| 6,463,459 B1 | 10/2002 | Orr et al. |
| 6,510,523 B1 | 1/2003 | Perlman et al. |
| 6,675,198 B1 | 1/2004 | Hagiwara et al. |
| 6,854,016 B1 | 2/2005 | Kraenzel et al. |
| 6,954,930 B2 | 10/2005 | Drake et al. |
| 6,973,482 B2 | 12/2005 | Mohammed et al. |
| 6,976,262 B1 | 12/2005 | Davis et al. |
| 6,999,912 B2 | 2/2006 | Loisey et al. |
| 7,080,404 B2 | 7/2006 | Abdo et al. |
| 7,130,891 B2 | 10/2006 | Bernardin et al. |
| 7,257,613 B2 | 8/2007 | Boudnik et al. |
| 7,269,580 B2 | 9/2007 | Matichuk |
| 7,299,274 B2 | 11/2007 | Rajarajan et al. |
| 7,313,588 B1 | 12/2007 | Shotton et al. |
| 2002/0026590 A1 | 2/2002 | Kusunoki |
| 2002/0129054 A1 | 9/2002 | Ferguson et al. |
| 2002/0174359 A1 | 11/2002 | Haltmeyer |
| 2002/0198965 A1 | 12/2002 | Kraft |
| 2003/0055968 A1 | 3/2003 | Hochmuth et al. |
| 2003/0217166 A1 | 11/2003 | Dal Canto et al. |
| 2004/0010786 A1 | 1/2004 | Cool et al. |

(Continued)

FOREIGN PATENT DOCUMENTS

KR          20030003314          1/2003

(Continued)

OTHER PUBLICATIONS

Mascolo et al., "XMILE: an XML based Approach for Incremental Code Mobility and Update," Automated Software Engineering, vol. 9, No. 2, Apr. 2002, found at <<http://www.cs.ucl.ac.uk/staff/c.mascolo/www/asemob.pdf>>, pp. 1-15.

(Continued)

*Primary Examiner* — Jeffrey Pwu
*Assistant Examiner* — Farhad Ali
(74) *Attorney, Agent, or Firm* — Merchant & Gould (57) ABSTRACT

Techniques for XML (Extensible Markup Language) web feeds for web access of remote resources are described. In one embodiment, a method includes obtaining information regarding one or more available resources from one or more resource hosts, rendering the information regarding one or more available resources into an Extensible Markup Language (XML) document, and providing the XML document to a user device.

21 Claims, 5 Drawing Sheets

U.S. PATENT DOCUMENTS

| | | |
|---|---|---|
| 2004/0045004 A1 | 3/2004 | Cheenath |
| 2004/0111519 A1 | 6/2004 | Fu et al. |
| 2004/0250130 A1 | 12/2004 | Billharz et al. |
| 2005/0044225 A1 | 2/2005 | Ota et al. |
| 2005/0080909 A1 | 4/2005 | Panasyuk et al. |
| 2005/0125529 A1 | 6/2005 | Brockway et al. |
| 2005/0125530 A1 | 6/2005 | Brockway et al. |
| 2005/0125560 A1 | 6/2005 | Brockway et al. |
| 2005/0125739 A1 | 6/2005 | Thompson et al. |
| 2005/0267972 A1 | 12/2005 | Costa-Requena et al. |
| 2006/0010125 A1 | 1/2006 | Beartusk et al. |
| 2006/0015740 A1 | 1/2006 | Kramer |
| 2006/0026235 A1 | 2/2006 | Schwarz et al. |
| 2006/0026284 A1 | 2/2006 | Nguyen |
| 2006/0069797 A1 | 3/2006 | Abdo et al. |
| 2006/0070131 A1 | 3/2006 | Braddy et al. |
| 2006/0112181 A1 | 5/2006 | Affaki |
| 2006/0136389 A1* | 6/2006 | Cover et al. ............ 707/3 |
| 2006/0142878 A1 | 6/2006 | Banik et al. |
| 2006/0143703 A1 | 6/2006 | Hopen et al. |
| 2006/0195895 A1 | 8/2006 | Ben-Shachar et al. |
| 2006/0230156 A1 | 10/2006 | Shappir et al. |
| 2006/0230438 A1 | 10/2006 | Shappir et al. |
| 2006/0236325 A1 | 10/2006 | Rao et al. |
| 2006/0248180 A1 | 11/2006 | Bernardi et al. |
| 2006/0282855 A1 | 12/2006 | Margulis |
| 2007/0033290 A1* | 2/2007 | Valen et al. ............ 709/231 |
| 2007/0061266 A1* | 3/2007 | Moore et al. ............ 705/51 |
| 2007/0094389 A1 | 4/2007 | Nussey et al. |
| 2007/0100900 A1* | 5/2007 | Gibbins ............ 707/201 |
| 2007/0124373 A1 | 5/2007 | Chatterjee et al. |
| 2007/0150551 A1 | 6/2007 | Krishnan et al. |
| 2007/0156687 A1 | 7/2007 | Idicula et al. |
| 2007/0156809 A1 | 7/2007 | Dickinson et al. |
| 2007/0162749 A1 | 7/2007 | Lim |
| 2007/0180448 A1 | 8/2007 | Low et al. |
| 2007/0198656 A1 | 8/2007 | Mazzaferri et al. |
| 2007/0203972 A1 | 8/2007 | Wewalaarachchi et al. |
| 2007/0233804 A1 | 10/2007 | Palekar et al. |
| 2007/0245240 A1 | 10/2007 | Hudson, Jr. |
| 2008/0034071 A1 | 2/2008 | Wilkinson et al. |

FOREIGN PATENT DOCUMENTS

| | | |
|---|---|---|
| WO | WO2007075846 A2 | 7/2007 |

OTHER PUBLICATIONS

Baude et al., "Interactive and Descriptor-based Deployment of Object-Oriented Grid Applications," Proceedings 11th IEEE Intl Symposium on High Performance Distributed Computing, 2002, found at at<<http://citeseer.ist.psu.edu/cache/papers/cs/26702/http:zSzzSzwww-sop.inria.frzSzoasiszSzJulien.VayssierezSzpublicationszSzhpdc2002_vayssiere.pdf/baude02interactive.pdf>>, 10 pgs.

Bhatia et al., "Extending Grid Protocols onto the Desktop using the Mozilla Framework," Proceedings of GCE'06, 2006, found at <<http://www.cogkit.org/GCE06/papers/CameraReady_126.pdf>>, pp. 1-4.

General, "Secure Foundations for Microsoft Terminal Services," accessible at <<http://www.giac.org/certified_professionals/practicals/gsec/3578.phpu>>, GSEC Practical V1Ab, Jan. 11, 2004, pp. 1-21.

Tsai, et al., "Towards Ubiquitous Computing via Secure Desktop Service," accessible at <<http://ieeexplore.ieee.org/iel5/7544/20542/00949577.pdf?isNumber=>>, IEEE Catalog No. 01CH37239, 2001, pp. 187-190.

MacDonald, "Secure Access of Network Resources by Remote Clients," accessible at <<http://www.sans.org/reading_room/whitepapers/vpns/759.php>>, GSEC version 1.3, SANS Institute, 2002, Feb. 20, 2006, pp. 1-22.

"ProLiant Essentials Integrated Lights-Out Advanced Pack", available at least as early as Jun. 27, 2007, at <<http://h18000.www1.hp.com/products/quickspecs/11052_div/11052_div.HTML>>, Hewlett-Packard, 2004, pp. 1-3.

"iShadow Desktop—The Universal Citrix ICA, Terminal Services RDP, and VNC Client", available at least as early as Jun. 27, 2007, at <<http://www.dabcc.com/showcontent.aspx?id=2420>>, pp. 1-4.

Lubonski et al., "An Adaptation Architecture to Improve User-Perceived QoS of Multimedia Services for Enterprise Remote Desktop Protocols", Next Generation Internet Networks, Apr. 18-20, 2005, pp. 149-156.

"VMware Virtual Infrastructure", available at least as early as Jun. 27, 2007, at <<http://www.centriserv.com/products_vmware.php>>, CentriServ, 2006, pp. 1.

Miles, "Implementing Windows Terminal Server and Citrix MetaFrame on IBM @ server xSeries Servers", found at <<http://www.redbooks.ibm.com/redpapers/pdfs/redp3629.pdf>>, International Business Machines Corporation, Apr. 2003, 60 pgs.

"Using Terminal Services in Application Server Mode with Small Business Server 2000," retrieved on Oct. 10, 2007 at <<http://www.microsoft.com/technet/prodtechnol/sbs/2000/maintain/termsvcs.mspx>>, 2002, 13 pgs.

"Technical Overview of Management Services," Microsoft Windows Server 2003, retrieved from <<http://download.microsoft.com/download/1/c/7/1c701994-9f8a-47c2-ad65-7265356c10eb/Manageover.doc>>, Jul. 2002, 47 pgs.

Gelu, "Securing Access to External Networks with Authentication, Authorization and Accountability", found at <<http://www.loloweb.dyns.cx/files/gsec_gelu_laurent.pdf>>, GIAC Security Essentials Certification (GSEC), Apr. 7, 2004, pp. 1-19.

Helander, et al., "eLearning for Engineering," 9th International Conference on Engineering Education, Session M5H, Jul. 23-28, 2006, 6 pgs.

Rouse, "Managing Terminal Services with Group Policy," retreived on Oct. 3, 2007 at <<http://www.msterminalservices.org/articles/Managing-Terminal-Services-Group-Policy.html>>, Mar. 15, 2007, 11 pgs.

"Terminal Services Gateway (TS Gateway)", retrieved on Oct. 3, 2007 at <<http://technet2.microsoft.com/windowsserver2008/en/library/9da3742f-699d-4476-b050-c50aa14aaf081033.mspx?mfr=true>>, Microsoft Corporation, Sep. 24, 2007, 8 pgs.

"Remote Users Group Policies," retrieved on Oct. 3, 2007 at <<http://www.cleo.net.uk/index.php?category_id=332>>, CLEO, 2005, 6 pgs.

Smith, "S.H.A.U.N: Secure Hospital Access from the University Network," available at <<http://www.ja.net/community/nhs/shaun.pdf>>, Addenbrooke's NHS Trust, Jan. 2004, pp. 1-11.

"Access to Work—Dev Design Specification", Microsoft Confidential, Version 1, pp. 1-25.

Jose, "Workspace Versioning and Configuration Management API", retrieved on Apr. 15, 2008 at <<http://www.reswhitepapers.com/documents/VirtualizedUserWorkspaceManagementBeyondDesktopManagement.pdf>>, Java Boutique, pp. 1-3.

Koetzing, "Centralizing Application Access with Visionapp Workspace Management 2008", retrieved on Apr. 15, 2008 at <<http://www.thomaskoetzing.de/index.php?option=com_content&task=view&id=266&Itemid=289>>, Thomas Koetzing, Mar. 26, 2008, pp. 1-5.

"M2 Access to Work—Dev Design Specification", Microsoft Confidential, Version 1.0, pp. 1-21.

"Virtualized User Workspace Management for Windows Environments", RES Software, 2007, pp. 1-6.

"Workspace Integration Into Win7 Networking UI—Feature Summary", Windows Server—Terminal Services Team, pp. 1-8.

"Workspace Runtime—Dev Design Specification", Microsoft Confidential, Version 1, pp. 1-15.

"International Search Report", Mailed Date: Oct. 16, 2009, Application No. PCT/US2009/032599, Filed Date: Jan. 30, 2009, pp. 11.

* cited by examiner

XML-BASED WEB FEED FOR WEB ACCESS OF REMOTE RESOURCES

CROSS-REFERENCE TO RELATED APPLICATIONS

This patent application is related to co-pending, commonly-owned U.S. patent application Ser No. 12/039,732 entitled "Centralized Publishing of Network Resources," filed Feb. 28, 2008, which application is incorporated herein by reference

BACKGROUND

Users understand and know how to launch resources on their local computer. When connected to a domain (e.g. Active Directory domain), administrators can ease the burden of installing resources and setting up remote desktops by pushing the resources and settings out via Group Policy.

Current methods of "installing" resources to non-managed desktops over the internet are far from perfect. There are only a few options such as sending out installation files that the users have to install, or using technology such as Terminal Services (TS) Web Access, where an administrator may give users a Uniform Resource Locator (URL) to visit that allows users to launch remote programs through the webpage. However, these types of installations have limitations. For example, anything a user has to install locally means that the administrator has lost control of patching the resources or upgrading the application without the help of the user installing an additional package. Solutions such as TS Web Access are great for providing the ability to manage the resources, but they may be limited in other ways, such as the inability to double click on a file and launch the remote application. Therefore, methods and systems that reduce or mitigate these undesirable aspects of the conventional methods would have considerable utility.

SUMMARY

Techniques for XML (Extensible Markup Language)-based web feeds for web access of remote resources are described. Generally, implementations in accordance with the present disclosure advantageously allow an administrator to add, remove and update resources from a non-managed machine, and still allow those resources to behave like a locally-installed resource, such as having the ability to take over file extensions.

In one embodiment, a method includes obtaining information regarding one or more available resources from one or more resource hosts, rendering the information regarding one or more available resources into an Extensible Markup Language (XML) document that describes the one or more available resources in a non-client specific format, and providing the XML document to a user device. In some embodiments, providing the XML document may including providing the XML document as a syndication feed. In further embodiments, rendering the information may include providing timestamp information for each of the one or more available resources, wherein the timestamp information enables the user device to determine whether each of the one or more available resources have been modified from a previously-available resource version.

In another embodiment, a method includes receiving an Extensible Markup Language (XML) document containing information regarding one or more available resources from one or more remote resource hosts, parsing the XML document to determine the one or more available resources, and displaying information regarding the one or more available resources. The XML document describes the one or more available resources in a non-client specific format. In some embodiments, the parsing of the XML document may include parsing the XML document to provide one or more of remote application files, icons, or RDP files.

In yet another embodiment, a computing system includes a processing unit, a communication component operatively coupled to the processing unit and configured to operatively communicate with a user device and with one or more resource hosts, and a memory operatively coupled to the processing unit. The memory includes an Extensible Markup Language (XML) presentation layer stored thereon and configured to perform operations that, when executed on the processing unit, perform a method including obtaining information regarding one or more available resources from the one or more resource hosts, rendering the information regarding one or more available resources into an XML document that describes the one or more available resources in a non-client specific format, and providing the XML document to the user device. In alternate embodiments, the method further includes determining whether a current list of available resources is cached and available to provide to the client device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical items.

DETAILED DESCRIPTION

Techniques for XML (Extensible Markup Language)-based web feeds for web access of remote resources are disclosed herein. Generally, embodiments of systems and methods in accordance with the present disclosure advantageously provide an ability to launch remote programs that behave much like a locally-installed program after it has been launched (e.g. clipboard access, tooltip integration, etc.). In addition, such embodiments may leverage the infrastructure of existing web access systems, and may also allow an administrator to efficiently add, remove and update applications from a non-managed machine.

Figure 1:
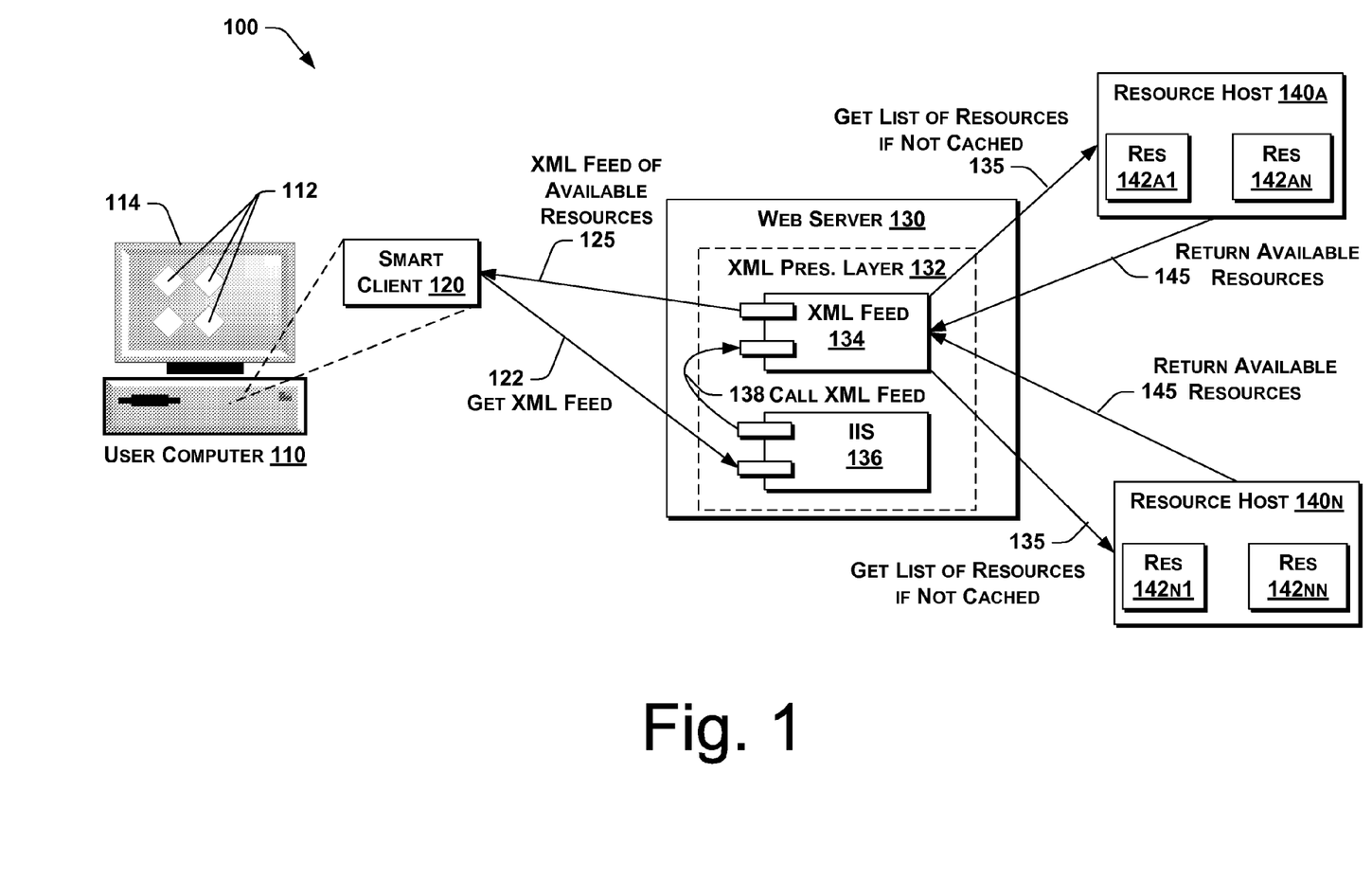
FIG. 1 illustrates an exemplary environment for implementing techniques for XML-based web feeds for web access of remote resources in accordance with the present disclosure.

FIG. 1 illustrates an exemplary environment 100 for implementing techniques for XML-based web feeds for web access of remote resources in accordance with one or more embodiments of the present disclosure. In this embodiment, the environment 100 includes a user computer 110 operatively communicating with a web server 130 which, in turn, operatively communicates with a plurality of resource hosts 140. The resource hosts 140 may include, for example, terminal servers, directories, directory services (e.g. Active Directory), centralized publishing sources, or any other suitable hosts or sources. More specifically, a smart client 120 installed on the user computer 110 operatively communicates with an XML presentation layer 132 installed on the web server 130. The XML presentation layer 132 may include a feed component 134 and an Internet Information Server (IIS) 136. Each resource host 140 has one or more resources 142 installed thereon. Such resources may include, for example, applications, software programs, desktops, documents, data, or any other suitable resources.

In operation, the smart client 120 may make a request 122 to the web server 130 for available resources found on remote resource hosts 140. In some embodiments, the IIS 136 of the XML presentation layer 132 receives the request 122 and provides a call 138 for an XML feed to the XML feed component 134. In some embodiments, the XML presentation layer 132 determines whether a current list of available resources is already cached and available to provide to the smart client 120. If a current list of resources is not cached, the XML presentation layer 132 (e.g. using the XML feed component 134) sends requests 135 to one or more of the resource hosts 140 for a list of resources available on each of the resource hosts 140. The resource hosts 140 return lists 145 of available resources 142 that are available on each respective resource host 140. The XML feed component 134 renders the lists 145 into an XML feed 125 that is provided back to the smart client 120. Icons 112 corresponding to the resources 142 available on the remote resource hosts 140 may be displayed on a display component 114 of the user computer 110. A user (not shown) may launch selected resources 142 by clicking on the corresponding icons 112, allowing the user to use the resources 142 much like a locally-installed program.

The XML feed 125 provided by the XML presentation layer 132 may be a tightly-structured XML format for encoding resource data 145 (including, for example, application data). Thus, unlike conventional web access systems that may use loosely-structured XML format (e.g. Extensible HyperText Markup Language) that is presentation-based and generally oriented around describing a user experience, and is intended for consumption by a web browser (i.e. is client specific), the XML feed 125 provided by the XML presentation layer 132 may be structured more rigorously, and may be used to accomplish a different purpose. The XML feed 125 of the present disclosure may include additional information that a XML format that is presentation-based can not make use of, such as file associations, client configuration data and other data that are unknown or unforeseen at this time. Furthermore, the XML feed 125 of the present disclosure is non-client specific (i.e. is general), and describes the available resources without making any assumptions about the consuming software. The XML feed 125 is intended to be consumed in a variety of ways, including some ways that are unknown or unforeseen at this time.

In some embodiments, an existing web access system for accessing remote resources, such as the Terminal Services (TS) Web Access system available from Microsoft Corporation, may incorporate aspects of the present disclosure to provide improved service to users of remote resources. Other systems that enable remote access to resources via a network that may be used include, for example, PC-Duo Remote Control available from Vector Networks, products available from Citrix, or any other suitable remote network access systems. Such web access systems may advantageously include XML feeds in accordance with the present disclosure to collect resource data from resource hosts, including terminal servers.

For example, in some embodiments, an administrator may give the user a Uniform Resource Locator (URL) to point the smart client 120 toward. The URL could be provided through an electronic communication system (e.g. Exchange®, Everest®, the Zimbra Collaboration Suite, or other suitable system or method), and doesn't necessarily preclude that the user has to specifically configure the smart client 120 with the URL. Once the smart client is configured and authenticated, the start menu on the client machine may include remote resources that the administrator has made available to that user. In addition, file associations may be made for those programs.

When an administrator removes or adds resources available to the user, these changes may be mirrored on the client computer's start menu and the file associations may be updated accordingly. From this point on, when a user selects a file, it may open in either a local or remote resource if one exists that can handle that file type.

One of the advantages of publishing network resources, such as remote resources, through XML documents is the wide range of standard technologies that support this delivery method. Embodiments in accordance with the present disclosure may also allow an administrator to easily add, remove and update resources available to a non-managed machine, and allow those resources to behave like a locally-installed resource.

Figure 2:
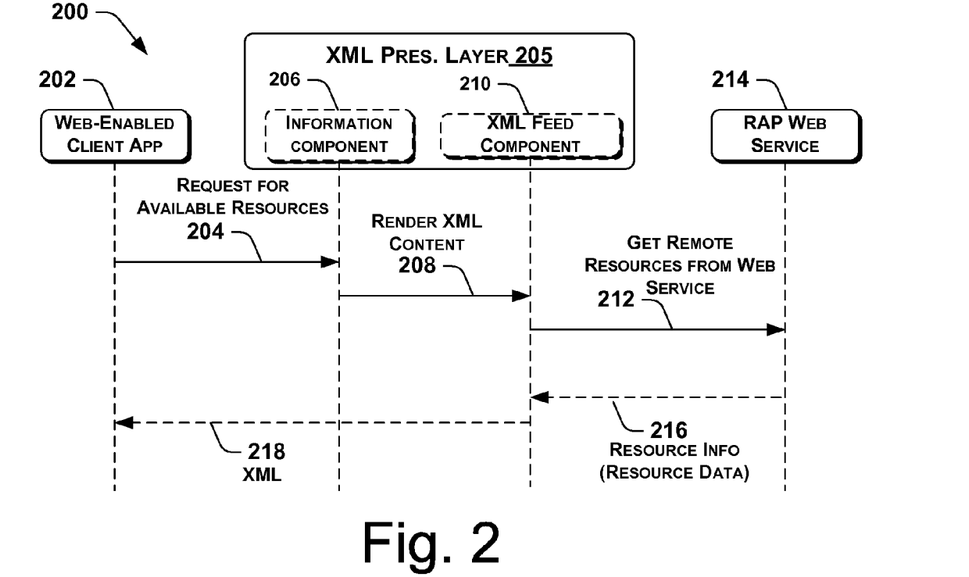
FIG. 2 is a diagram illustrating a connection sequence for fetching an XML feed in accordance with an embodiment of the present disclosure.

FIG. 2 is a diagram illustrating a connection sequence 200 for fetching an XML feed in accordance with an embodiment of the present disclosure. In this embodiment, a web-enabled client application 202 provides a request 204 for available resources to an XML presentation layer 205. For example, in some embodiments, the web-enabled client application 202 may be a smart client installed on a user computer as shown in FIG. 1. Alternately, the web-enabled client application 202 may be installed on a variety of suitable platforms such as, for example, a cellular telephone, a personal data assistant (PDA), a mobile navigational device, a WiFi-enabled component, or any other suitable platform.

As further shown in FIG. 2, the XML presentation layer 205 receives the request 204 (e.g. via an information component 206 or other suitable component). The XML presentation layer 205 is configured to render XML content 208 (e.g. using an XML feed component 210 or other suitable component). The XML presentation layer 205 then requests 212 remote resources from a remote application publishing (RAP) web service 214, such as the Terminal Services RAP Web Access service available from Microsoft Corporation. The RAP web service 214 provides resource information 216, including available resources, to the XML presentation layer 205. The XML presentation layer 205 renders the resource information 216 into an XML feed 218 which is provided back to the web-enabled client application 202.

In a particular embodiment, the XML presentation layer 205 uses an existing Terminal Services Web Access (TSWA) structure for setup and data transport, but incorporates novel components and features that transform the list of discoverable resources 216 into an XML document 218 that may include, for example, the resources, icons and Remote Desktop Protocol (RDP) files. Thus, the XML presentation layer 205 provides an XML document 218 that can then be transformed into a Hypertext Markup Language (HTML) document or consumed directly by other resources.

Figure 3:
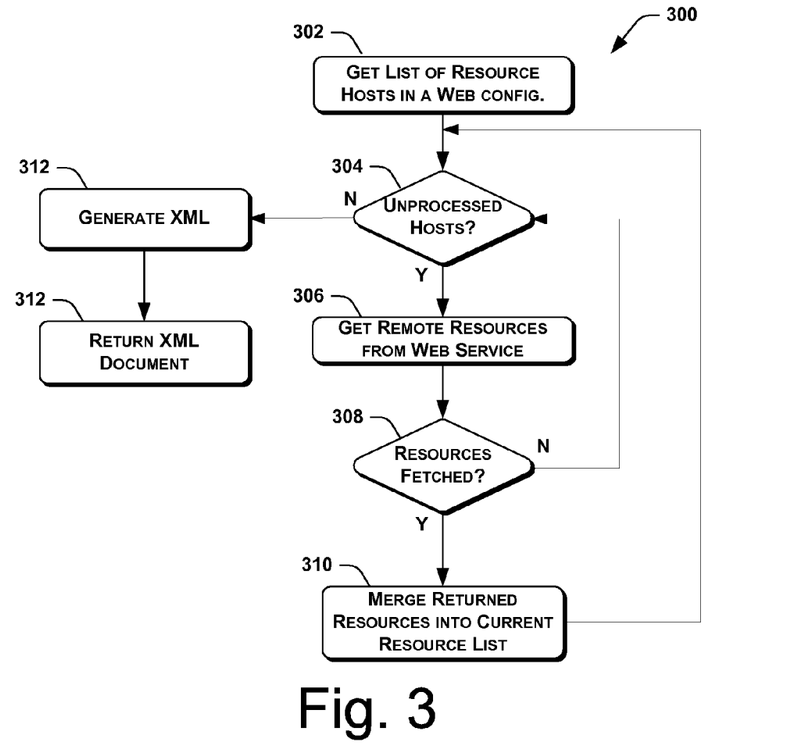
FIG. 3 is a flowchart of a process for rendering XML content in accordance with an embodiment of the present disclosure.

FIG. 3 is a flowchart of a process 300 for rendering XML content that may be performed by the XML presentation layer 205 in accordance with an embodiment of the present disclosure. In this embodiment, the process 300 includes getting a list of resource hosts in a web configuration at 302. At 304, the process 300 determines whether there are any servers from the list of servers that have not yet been processed. If so, then the process 300 gets remote resources from a web service at 306, and at 308, the process 300 determines whether all of the resources have been fetched from the unprocessed server. If not, then the process 300 returns to 304 and continues determining unprocessed servers (at 304) and getting remote resources (at 306) until all remote resources have been fetched (at 308).

At 310, the process 300 merges returned resources into a current resource list, and the process 300 returns to 304 to determine whether there are any unprocessed servers remaining. Once there are no more unprocessed servers remaining (at 304), the process 300 generates an XML document (or feed) of the current resource list at 312, and returns the XML document of the current resource list at 314.

Figure 4:
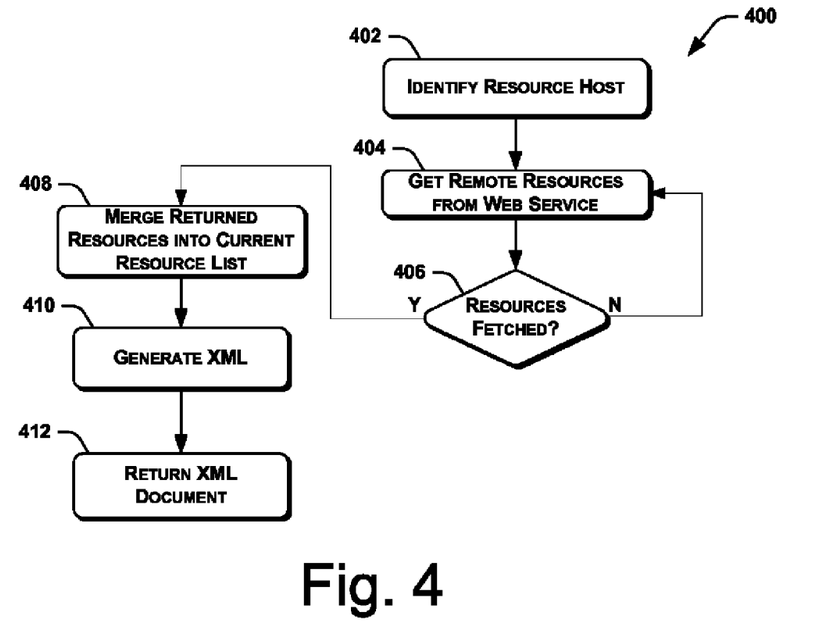
FIG. 4 is a flowchart of a process for rendering XML content in accordance with another embodiment of the present disclosure.

FIG. 4 is a flowchart of a process 400 for rendering XML content that may be performed by the XML presentation layer 205 in accordance with another embodiment of the present disclosure. In this embodiment, the process 400 includes identifying a remote terminal server at 402. At 404, the process 400 gets remote resources from the remote terminal server via a web service, and determines whether all resources from the remote terminal server have been fetched at 406. If not, the process 400 returns to 404 and continues getting remote resources from the web service.

Once all resources have been fetched (at 406), the process 400 merges returned resources into a current resource list at 408. An XML document (or feed) of the current resource list is generated at 410, and the XML document of the current resource list is returned to a web-enabled client resource at 412.

Figure 5:
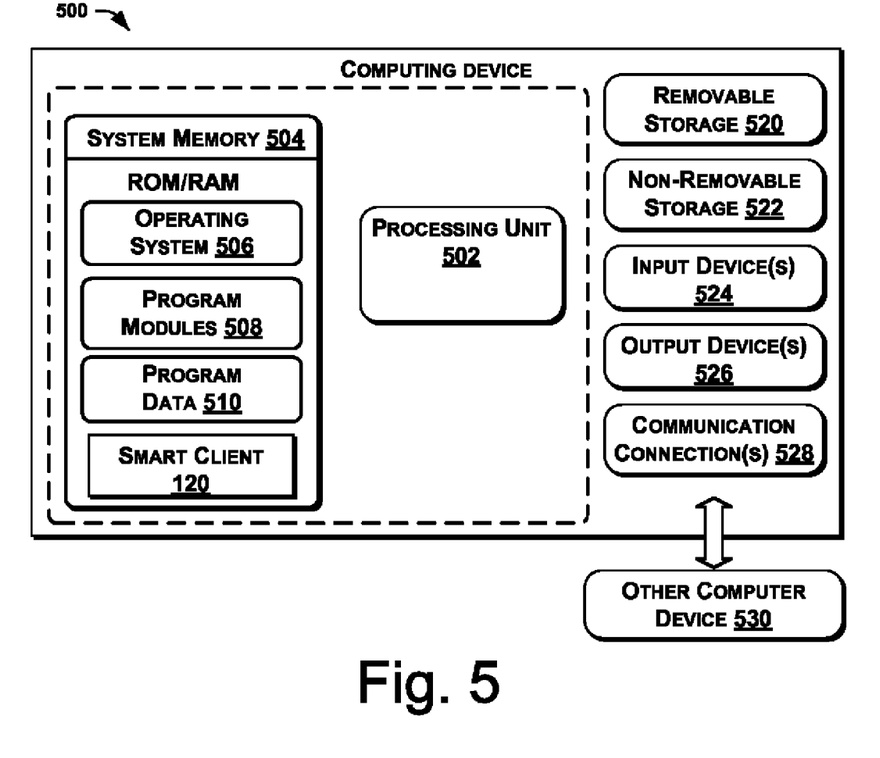
FIG. 5 is a schematic view of a user computer of the environment of FIG. 1 in accordance with an embodiment of the present disclosure.

The user computer 110 that receives the XML feed of available resources from the XML presentation layer may be any suitable computing device or platform. For example, FIG. 5 is a schematic view of a computing device 500 in accordance with an embodiment of the present disclosure. In a very basic configuration, the computing device 500 includes at least one processing unit 502 and system memory 504. Depending on the exact configuration and type of computing device 500, the system memory 504 may be volatile (such as RAM), non-volatile (such as ROM and flash memory) or some combination of the two. The system memory 504 typically includes an operating system 506, one or more program modules 508, and may include program data 510. As an alternative, program modules 508, as well as the other modules, may be implemented as part of the operating system 506, or it may be installed on the computing device and stored in other memory (e.g., non-removable storage 522) separate from the system memory 504.

As further shown in FIG. 5, the smart client 120 is stored in the system memory 504. The smart client 120 is configured to operatively communicate with the XML presentation layer 132 to provide an ability to launch remote programs that behave much like a locally-installed program after it has been launched. An embodiment of the smart client 120 is described more fully below with respect to FIG. 6.

The computing device 500 may have additional features or functionality. For example, the computing device 500 may also include additional data storage devices (removable and/or non-removable) such as, for example, magnetic disks, optical disks, or tape. Such additional storage is illustrated in FIG. 8 by removable storage 520 and non-removable storage 522. Computer storage media may include volatile and non-volatile, removable and non-removable media implemented in any method or technology for storage of information, such as computer readable instructions, data structures, program modules, or other data. The system memory 506, removable storage 520 and non-removable storage 522 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of the device 500. Computing device 500 may also have input device(s) 524 such as keyboard, mouse, pen, voice input device, and touch input devices. Output device(s) 526 such as a display, speakers, and printer, may also be included. These devices are well known in the art and need not be discussed at length.

The computing device 500 may also contain a communication connection 528 that allow the device to communicate with other computing devices 530, such as over a network. Communication connection(s) 528 is one example of communication media. Communication media may typically be embodied by computer readable instructions, data structures, program modules, or other data in a modulated data signal, such as a carrier wave or other transport mechanism, and includes any information delivery media.

Various modules and techniques may be described herein in the general context of computer-executable instructions, such as program modules, executed by one or more computers or other devices. Generally, program modules include routines, programs, objects, components, data structures, and so forth for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

It will be appreciated that the smart client 120 may be configured in a wide variety of ways to provide the desired functionalities and capabilities described herein. For example, FIG. 6 is a diagrammatic view of a smart client 620 and various interactions with other components 610 of a representative environment 600 in accordance with a particular embodiment of the present disclosure.

Figure 6:
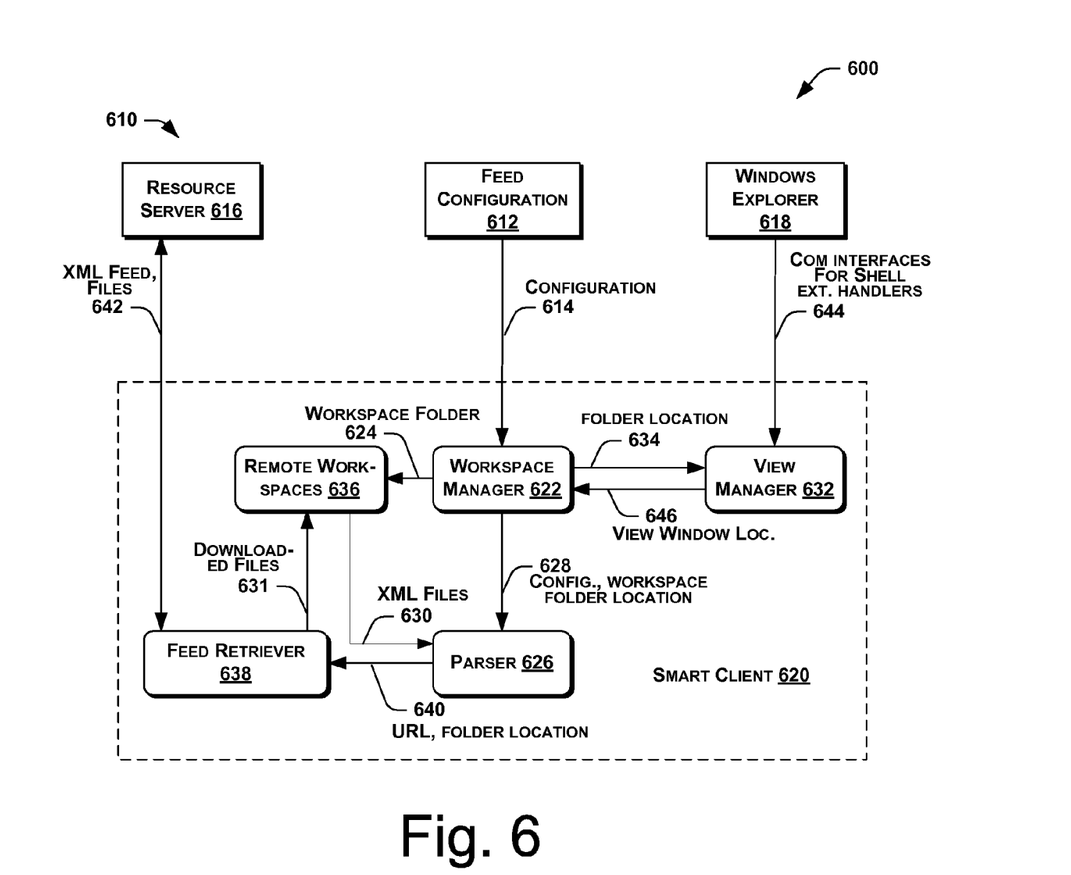
FIG. 6 is a schematic view of a data flow diagram of the environment of FIG. 1 in accordance with the present disclosure.

In the embodiment shown in FIG. 6, the smart client 600 includes a workspace manager 622 that operatively communicates with a feed configuration 612 of the environment 600. In some embodiments, the feed configuration 612 represents user input when connecting to a workspace 614, and may include a Uniform Resource Locator (URL) and credentials to obtain the resources feed.

The workspace manager 622 may be the central manager (or driver) of some or all of the activities associated with the functions of the smart client 620. In some embodiments, the workspace manager 622 may be configured to perform one or more of the following: manage creation and deletion of workspace folders 624, invoke a parser 626 to gather remote resources 628 or downloaded files 630 (e.g. RDP files) into a specified folder location, invoke a view manager 632 to display the remote resources (e.g. by providing a specified folder location 634), manage multiple remote workspaces 636, or any other suitable functions.

For example, in some embodiments, the workspace manager 622 may create a user interface (UI) thread and may set up a window message loop. The window message loop may be called during creation of an object. Requests to perform operations on the workspaces 636 may be serialized to the UI thread through the message loop. In particular embodiments, the serialization of the UI thread may allow only one configuration process to be ongoing at one time (i.e. configuring a new workspace). Attempts by a user to perform more than one operation at a time (e.g. starting a "Connect to Workspace" operation, then starting it again before the first is done configuring) may be prevented by bringing to foreground the ongoing configurations window. The serialization of the UI thread, however, may not prevent multiple workspace windows to be open at the same time. Once the configuration process is complete and a workspace window is displayed, window events may be conveyed to the window procedure owned by the UI thread. Thus, the serialized UI thread can handle multiple open windows and also respond to new workspace management requests. In some embodiments, the UI thread may not perform any blocking activities such as network requests, disk access, etc. Instead, such blocking activities may be handed off to a separate worker thread spawned by the UI thread, and the worker thread may invoke the parser 626 to handle the blocking activity. The UI thread may also give the user the option to cancel out of any blocking activity.

The parser 626 may be responsible for invoking a feed retriever 638 to fetch a feed of remote resources specified in XML. In particular embodiments, the parser 626 may also perform one or more of the following: parse the XML files 630 to extract information about RDP files and icons for each remote resource, and invoke the feed retriever to download RDP files and icons into a specified folder 640.

The feed retriever 638 may manage the connection with a resource server 616 (such as the web server 130 of FIG. 1). More specifically, the feed retriever 638 may be configured to download information 642 (XML files, RDP files, icons, etc.) from the resource server 614.

The view manager 632 may be configured to handle the display of remote resources. The view manager 632 may also be configured to perform one or more of the following: create and configure an explorer browser control to host the RDP files downloaded by the components of the smart client 620, and to act as a Shell Extension Handler for RDP file types 644 to customize the look and feel (e.g. view window, location, etc.) 646 of RDP files in a displayed folder.

In a particular embodiment, the functions of the view manager 626 may be performed in different contexts. For example, in a first context, the Windows Explorer® 618 (by the Microsoft Corporation) may invoke the shell extension handler for RDP files (e.g. via COM) prior to displaying the files in an explorer browser control. In alternate contexts, other methods for handling RDP files prior to display may be used.

In operation, the components of the smart client 620 may cooperatively obtain the data (resources) regarding the workspace including communicating with the server 616 to obtain a list of resources, and presenting the data in a user interface (e.g. displaying the icons and/or RDP files). The smart client 620 may communicate with the resource server 616 to obtain a list of resources. The resources may be ultimately represented on the client computer 110 as RDP files. When the smart client 620 presents the data in a user interface (UI), it may involve one or more of the following: presenting the RDP files in a UI that encapsulates the explorer browser control, or customizing the behavior and appearance of RDP files using Shell extension handlers.

Figure 7:
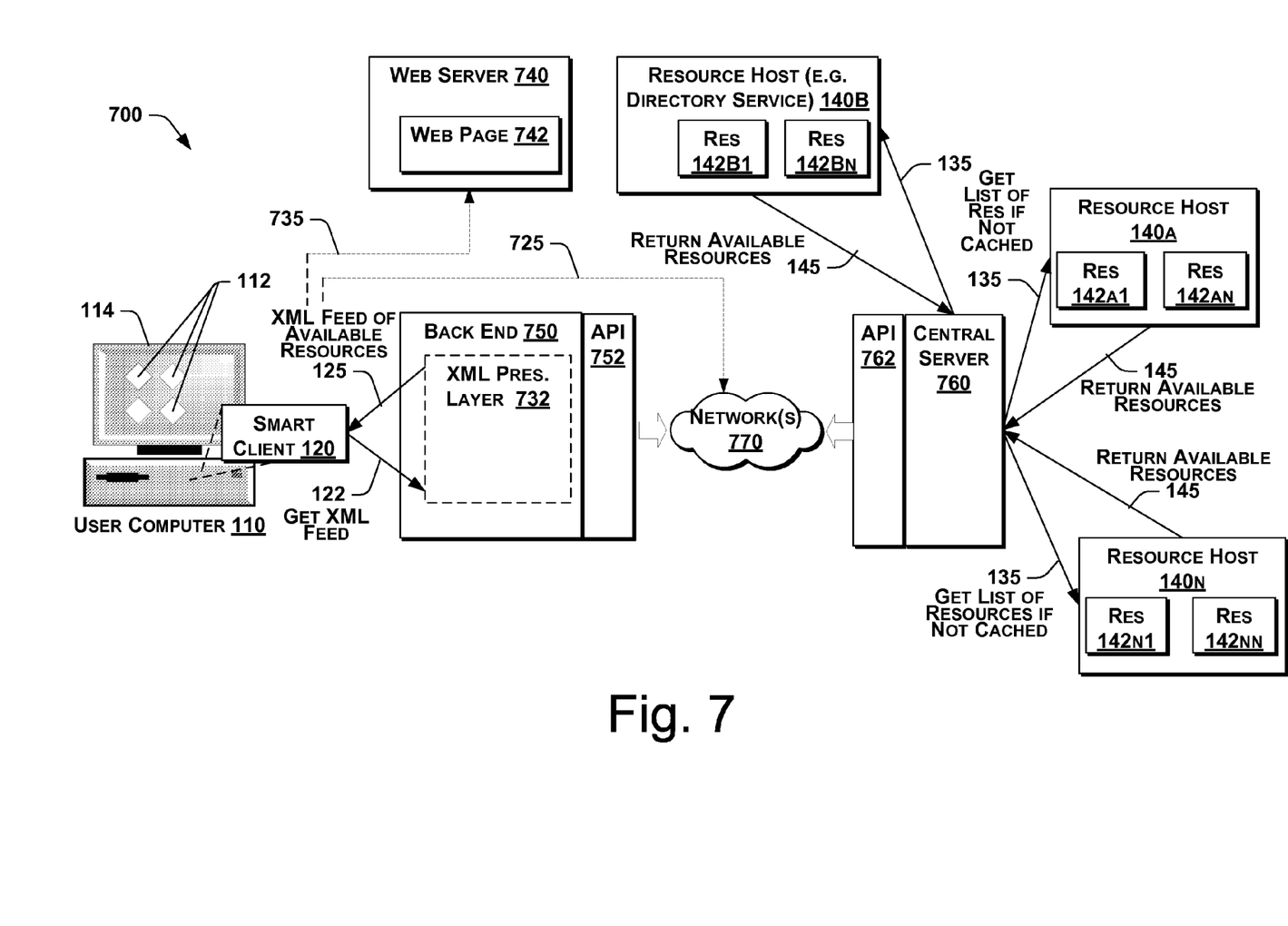
FIG. 7 illustrates an alternate environment for implementing techniques for XML-based web feeds for web access of remote resources in accordance the present disclosure.

It will be appreciated that, based on the teachings of the present disclosure, a variety of alternate embodiments may be conceived, and that the present disclosure is not limited to the particular embodiments described herein and shown in the accompanying figures. For example, FIG. 7 illustrates an alternate environment 700 for implementing techniques for XML-based web feeds in accordance with the present disclosure. In this embodiment, the environment 700 includes a user computer 110 having a smart client 120. A back end 750 operatively communicates with the smart client 120 and with a central server 760 via Application Programming Interfaces 752, 762 and one or more networks 770. The back end 750 includes an XML presentation layer 732 having a feed component 134 and an Internet information server (IIS) 136.

The central server 760 operatively communicates with one or more remote resource hosts 140 having one or more resources (or software programs) 142 installed thereon. In the embodiment shown in FIG. 7, for example, the resource hosts 140 include a directory service 140B, such as the directory service known as Active Directory developed by Microsoft Corporation. As noted above, the resource hosts 140 may include terminal servers, directories, directory services (e.g. Active Directory), centralized publishing sources, or any other suitable hosts or sources.

In operation, the smart client 120 makes a request 122 to the back end 750 for available resources found on remote resource hosts 140. In some embodiments, the IIS 136 of the XML presentation layer 732 receives the request 122 and provides a call 138 for an XML feed to the XML feed component 134. In some embodiments, the XML presentation layer 732 determines whether a current list of available resources is already cached and available to provide to the smart client 120, and if so, then the cached list is provided to the smart client 120. If a current list of resources is not cached, the XML presentation layer 732 (e.g. using the XML feed component 134) communicates a request for current resources to the central server 760, which sends requests 135 to the resource hosts 140 for a list of resources available on each of the resource hosts 140. The resource hosts 140 return lists 145 of available resources 142 that are available on each respective terminal server 140, and the central server 760 provides the available resources information back to the back end 750. As described above, the XML feed component 134 renders the lists 145 into an XML feed 125 that is provided back to the smart client 120. Icons 112 corresponding to the resources 142 may be displayed on a display component 114 of the user computer 110, allowing the user to use the resources 142 much like a locally-installed program.

In further embodiments, the XML feed 125 may be used in a variety of alternate ways, and may not be limited to delivery to the user computer 110. For example, as shown in FIG. 7, the XML feed 125 may be fed-back 725 via the network 770 to the central server 760, or to the resource hosts 140. The fed-back XML feed 725 may, for example, be used by the resource hosts 140 to determine which resources to host, or for any other suitable use. In still other embodiments, the XML feed 125 may be provided 735 to a web server 740 which may consume the XML feed 125 for various purposes, such as, for example, transforming it (e.g. through technologies such as Extensible Stylesheet Language Transformations (XSLT)) into an HTML web page 742.

As noted above, one of the advantages of publishing network resources, such as remote resources 142, through XML documents 125 is the wide range of standard technologies that support this delivery method. One such technology is generally referred to as web syndication, which simplifies the process of notifying end-users about changes to published network resources.

For example, it may be of interest to the end-user that their personal client computer should constantly grant them seamless access to all available network resources (such as remote resources 142). In accordance with the teachings of the present disclosure, such resources may be published in a single XML document 125. As changes in this XML document 125 occur, the end-user would like them to be reflected on their user computer (or other platform) 110. A synchronization mechanism may be implemented to automatically accomplish this synchronization between the user computer 110 configuration and the published resource data. For example, in some embodiments, a process on the user computer 110 may periodically download the full XML file 125, compare it to the configuration on the user computer 110, and update the configuration of the user computer 110 (or client configuration) to incorporate any recent changes.

Because the XML document may describe dozens or even hundreds of available resources, such an auto-synchronization mechanism may require significant resource overhead for both client and web server. Since it may be anticipated that most published resources will remain the same for long periods of time, it may be possible to significantly reduce the overhead burden associated with such synchronization activities by providing timestamp information be included in each resource node of the XML document 125.

More specifically, with reference to FIGS. 1 and 7, the rendering of the information 145 regarding one or more available resources into an XML document 125 could include providing timestamp information for each of the one or more available resources, the timestamp information enabling the user computer 110 to determine whether each of the one or more available resources have been modified from a previously-available resource version. This would allow the smart client 120 to analyze the timestamp information and only download supplementary files (such as RDP files and icons) for such resources that have changed. Such a synchronization mechanism may require each resource (or application) to undergo some processing at each synchronization, and may require the client-side state to retain some data for each remote resource (e.g. in the form of a "last updated" time value).

In further embodiments, web syndication technologies (such as Really Simple Syndication or Atom) may provide an alternate solution to the need to reduce synchronization overhead (see, e.g., http://www.rssboard.org/rss-specification; http://tools.ietf.org/html/rfe4287). These technologies may supplement a primary web resource with time-based information about changes to that resource. This is implemented in a "syndication feed," a web document at a well-known location that describes, in a machine-readable, standard XML language, what recent changes have occurred to that primary resource. For example, the web site of such publications as the New York Times may provide syndication feeds for several kinds of content. When, for example, a news article is added to the web site, an entry is also added to the associated syndication feed to notify users of the change. Syndication clients periodically retrieve this feed document from a URL, and by parsing this feed document, a syndication client can notify the user about recently added articles. Embodiments of XML feeds in accordance with the teachings of the present disclosure may similarly use web syndication technologies in the context of updating clients about changes to remote resources that may be installed on their user computers.

Although the computing device 500 of FIG. 5 is described as being representative of a user device (e.g. the user computer 110 of FIG. 1), it will be appreciated that in alternate embodiments, the computing device 500 may also be representative of other hardware devices of systems and methods disclosed herein. For example, if the smart client 120 of the computing device 500 is replaced with an XML presentation layer (e.g. XML presentation layer 132 of FIG. 1, XML presentation layer 205 of FIG. 2, or XML presentation layer 732 of FIG. 7), then the computing device 500 may represent an embodiment of the web server 130 of FIG. 1, or the back end 750 of FIG. 7. Similarly, by omission of the smart client 120, the computing device 500 may be representative of an embodiment of the central server 760 or the resource hosts 140 of FIG. 7.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:

obtaining information regarding one or more available resources from one or more resource hosts, wherein when a first available resource of the one or more available resources is a remotely executable application, the information regarding the first available resource includes launching information usable by a user device to launch the remotely executable application and file associations identifying one or more types of files associateable with the remotely executable application, the remotely executable application being remote to the user device;

rendering the information regarding the one or more available resources into an Extensible Markup Language (XML) document that describes the one or more available resources in a non-client specific format, the rendered information regarding the first available resource including at least one icon corresponding to the first available resource, wherein the at least one icon is clicked to launch the remotely executable application; and providing the XML document to the user device.

2. The method of claim 1, wherein providing the XML document to the user device includes providing the XML document in response to a request for available resources from the user device.

3. The method of claim 1, wherein providing the XML document to a user device includes providing the XML document as a syndication feed.

4. The method of claim 1, wherein providing the XML document to a user device includes providing the XML document having timestamp information for each of the one or more available resources, the timestamp information enabling the user device to determine whether each of the one or more available resources have been modified from a previously-available resource version.

5. The method of claim 1, wherein rendering the information regarding one or more available resources into an XML document includes rendering the information regarding one or more available resources into an XML document having timestamp information for each of the one or more available resources, the timestamp information enabling the user device to determine whether each of the one or more available resources have been modified from a previously-available resource version.

6. The method of claim 1, wherein rendering the information regarding one or more available resources into an XML document includes rendering the information regarding one or more available resources into an XML document using an XML presentation layer operating on a web server, the web server operatively communicating with the one or more resource hosts and with the user device.

7. The method of claim 6, wherein the XML presentation layer includes an XML feed component, and wherein rendering the information regarding one or more available resources into an XML document includes rendering the information regarding one or more available resources into an XML document using the XML feed component.

8. The method of claim 7, wherein the XML presentation layer includes an information component, the method further comprising receiving a request for available resources from the user device into the information component, and providing a call for an XML feed from the information component to the XML feed component.

9. The method of claim 1, wherein rendering the information regarding one or more available resources into an XML document includes rendering the information regarding one or more available resources into an XML document using an XML presentation layer operating on a back end server, the back end server operatively communicating with the user device and with a central server via a network, the central server operatively communicating with the one or more resource hosts.

10. The method of claim 9, wherein the XML presentation layer includes an XML feed component and an information component, and wherein rendering the information regarding one or more available resources into an XML document includes rendering the information regarding one or more available resources into an XML document using the XML feed component, the method further comprising receiving a request for available resources from the user device into the information component, and providing a call for an XML feed from the information component to the XML feed component.

11. The method of claim 1, further comprising determining whether a current list of available resources is cached and available to provide to the user device, and wherein obtaining information regarding one or more available resources from one or more resource hosts includes obtaining information regarding one or more available resources if the current list of available resources is not cached and available to provide to the user device.

12. The method of claim 1, wherein rendering the information regarding one or more available resources into an XML document includes rendering one or more of remote application files, icons, or RDP files.

13. A method, comprising:
receiving an Extensible Markup Language (XML) document containing information regarding one or more available resources from one or more remote resource hosts, the XML document being configured to describe the one or more available resources in a non-client specific format, a first available resource of the one or more available resources being a remotely executable application, the information including file associations identifying one or more types of files associateable with the remotely executable application;
parsing the XML document to determine the one or more available resources;
displaying information regarding the one or more available resources in a start menu of a client machine, the information including an icon associated with the first available resource, wherein the icon is clicked to launch the remotely executable application;
changing one or more resources of the one or more available resources by removing or adding the one or more resources with respect to being available to the client machine; and
automatically changing the information displayed in the start menu to correspond to the changing of the one or more resources.

14. The method of claim 13, wherein receiving an XML document containing information regarding one or more available resources from one or more remote resource hosts includes receiving an XML document as a syndication feed.

15. The method of claim 13, wherein receiving an XML document containing information regarding one or more available resources from one or more remote resource hosts includes receiving an XML document having timestamp information for each of the one or more available resources, the method further comprising determining whether each of the one or more available resources have been modified from a previously-available resource version using the timestamp information.

16. The method of claim 13, wherein parsing the XML document to determine the one or more available resources includes parsing the XML document to provide one or more of remote application files, icons, or RDP files.

17. A computing system, comprising:
a processing unit;
a communication component operatively coupled to the processing unit and configured to operatively communicate with a user device and with one or more resource hosts;
a memory operatively coupled to the processing unit and having an Extensible Markup Language (XML) presentation layer stored thereon, the XML presentation layer being configured to perform operations that, when executed on the processing unit, perform a method including:
obtaining information regarding one or more available resources from the one or more resource hosts, the information including launch information for a first available resource of the one or more available resources, the first available resource being a remotely executable application, the launch information including an icon that is clicked to launch the remotely executable application and file associations identifying one or more types of files associateable with the remotely executable application;

rendering the information regarding one or more available resources into an XML document that describes the one or more available resources in a non-client specific format;

providing the XML document to the user device; and providing the XML document back to the one or more resource hosts.

18. The system of claim 17, wherein providing the XML document to a user device includes providing the XML document as a syndication feed.

19. The system of claim 17, wherein rendering the information regarding one or more available resources into an XML document includes rendering the information regarding one or more available resources into an XML document having timestamp information for each of the one or more available resources, the timestamp information enabling the user device to determine whether each of the one or more available resources have been modified from a previously-available resource version.

20. The system of claim 17, wherein the method further includes determining whether a current list of available resources is cached and available to provide to the user device, and wherein obtaining information regarding one or more available resources from one or more resource hosts includes obtaining information regarding one or more available resources if the current list of available resources is not cached and available to provide to the user device.

21. A method, comprising:

receiving a request for an Extensible Markup Language (XML) resource list from a user device; and providing the XML resource list to the user device in response to the request from the user device, wherein:

the XML resource list contains information regarding one or more available resources and, when the one or more available resources includes a remotely executable application, launch information including an icon that is clicked using the user device to launch the remotely executable application and file associations identifying one or more types of files associateable with the remotely executable application; and the XML resource list contains timestamp information indicating the last time the one or more available resources was modified.

* * * * *